Jan. 5, 1932.  H. R. SETZ  1,839,420
INTERNAL COMBUSTION ENGINE
Filed Dec. 15, 1925
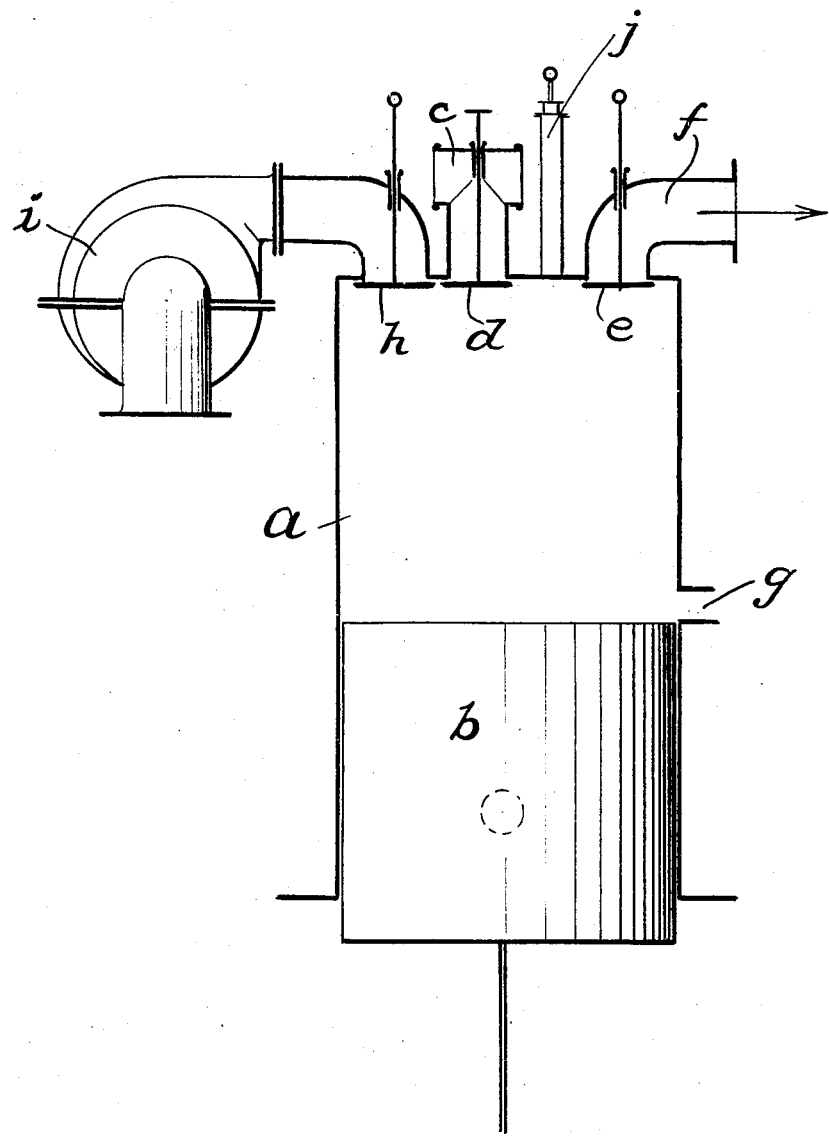
WITNESS:
INVENTOR
H. R. Setz, deceased,
Bertha E. Setz, Administratrix.
BY
ATTORNEYS.

Patented Jan. 5, 1932

1,839,420

UNITED STATES PATENT OFFICE

HANS R. SETZ, DECEASED, LATE OF HIGHLAND PARK, PENNSYLVANIA, BY BERTHA E. SETZ, ADMINISTRATRIX, OF HIGHLAND PARK, PENNSYLVANIA

INTERNAL COMBUSTION ENGINE

Application filed December 15, 1925. Serial No. 75,505.

The invention relates to an improvement in internal combustion engines, and more particularly to engines of the Diesel type operating on the four-cycle principle.

Heretofore in four-cycle Diesel engines, there has been provided in the cylinder wall an auxiliary exhaust port, in addition to the usual exhaust valve in the cylinder head.

The provision of such an auxiliary port results in material improvement in the working conditions of the exhaust valves, and is generally advantageous. Such an arrangement as has been heretofore provided is, however, open to serious objection in that some sort of valve and control is necessary for the auxiliary port in order to prevent induction into the cylinder of exhaust gases at the end of the suction stroke when the auxiliary port is uncovered by the piston. The necessity for valve and control substantially overbalances the advantages of the auxiliary port and deters its more frequent application.

Now it is the object of the invention to provide means whereby the auxiliary exhaust port may be utilized without the necessity for any valve or control other than that exercised by the engine piston, and at the same time make possible an increase in the power output of an engine embodying the invention.

Having now indicated, in a general way, the nature, purpose and advantage of the invention, a detailed description thereof follows with reference to the accompanying drawing in which has been illustrated a preferred embodiment and in which—

The figure is a diagrammatic view of an engine cylinder embodying the invention.

$a$ represents an engine cylinder, within which is adapted to work a piston $b$, the piston being illustrated in its lower dead center position. So positioned in the cylinder as to be completely uncovered when the piston is in lower dead center position is an auxiliary exhaust port $g$.

The cylinder head is provided with an exhaust port leading to a passage $f$ and controlled by means of a mechanically operated valve $e$, with an auxiliary air admission port communicating with a passage $c$ and controlled by a valve $d$, and with a suitable fuel injection valve $j$.

In the cylinder head there is also provided a port communicating with a passage leading to a compressor $i$, and controlled by a mechanically operated admission valve $h$ operated from the engine or by external power, as desired.

It will be noted that the exhaust passage $f$ and the auxiliary exhaust port $g$ are in communication with atmosphere while the valve $h$, contrary to usual practice, controls the admission to the cylinder of slightly precompressed air. The auxiliary air admission passage $c$ is in communication with atmosphere, but the valve $d$ comes into action only when the compressor $i$ is out of operation. The valve $d$ may be operated mechanically or by the suction of the piston when air is not admitted through valve $h$.

In the operation of the engine, the piston, in its expansion stroke, uncovers the auxiliary port $g$ for sufficient time to permit the gas pressure in the cylinder to drop practically to atmospheric before the exhaust valve $e$ opens. The exhaust valve $e$ opens as the piston starts the exhaust stroke and is timed to remain open during the entire exhaust stroke so as to permit the piston to expel the spent gases from the cylinder. Shortly before the piston reaches upper dead center, the valve $h$ opens and admits precompressed air supplied by compressor $i$, which sweeps any remaining spent gas out of the cylinder through the exhaust port, the valve $e$ being open.

As the piston starts down on the suction stroke, the exhaust valve closes, but the valve $h$ remains open during the entire stroke so that the cylinder is filled with a fresh charge of air at pressure sufficiently higher than atmosphere, so that when the auxiliary exhaust port $g$ is uncovered by the piston the air in the cylinder will blow out through the port and prevent any induction of spent gases.

The introduction of precompressed air as will be noted effectively increases the density of the air in the cylinder and obviates the necessity for any valve or control of the auxiliary exhaust port by effectively preventing the induction into the cylinder of spent gas. The valve h stays open until just after the piston has covered the port g on its compression stroke so that compression in the cylinder begins at substantially the pressure indicated by compressor i.

As has been indicated, the admission valve d controlling the admission of atmospheric air is utilized only to permit operation of the engine when the compressor is inoperative for any reason.

It will be understood that the invention is not to be considered as restricted to the embodiment shown and described, since it is capable of various applications without departing from the spirit thereof.

Having now fully described the invention, what is claimed is:

1. A four cycle engine comprising a cylinder, a piston in said cylinder, an exhaust port in the cylinder arranged to be uncovered by the piston during the latter portion of its outward stroke, and means for introducing air above atmospheric pressure into the cylinder during substantially the entire suction stroke and during the initial portion of the compression stroke.

2. The method of operating a four cycle internal combustion engine comprising a cylinder, a piston in said cylinder, and an exhaust port uncovered by the piston during the latter part of its outward stroke, including introducing air at greater than atmospheric pressure during substantially the entire suction stroke and during the initial portion of the compression stroke.

3. The method of operating a four cycle internal combustion engine comprising a cylinder, a piston in said cylinder, and an exhaust port uncovered by the piston during the latter part of its outward stroke, including introducing air at greater than atmospheric pressure during substantially the entire suction stroke and during the initial portion of the compression stroke, and introducing fuel during the compression stroke subsequently to the closure of the exhaust port.

4. The method of operating a four cycle internal combustion engine comprising a cylinder, a piston in said cylinder, an exhaust port uncovered by the piston during the latter part of its outward stroke, and a second exhaust port opened at the beginning of the exhaust stroke of the piston, including introducing air at greater than atmospheric pressure at the end of the exhaust stroke of the piston, during the suction stroke, and during the initial portion of the compression stroke, and introducing fuel during the compression stroke subsequently to the closure of the first mentioned exhaust port.

5. A four cycle engine comprising a cylinder, a piston in said cylinder, a fuel intake, an exhaust port in the cylinder arranged to be uncovered by the piston during the latter part of its outward stroke, means for introducing air above atmospheric pressure into the cylinder during the latter part of the exhaust stroke, during the suction stroke, and during the initial portion of the compression stroke, and means for introducing fuel during the compression stroke subsequently to the closure of the exhaust port.

6. A four cycle engine comprising a cylinder, a piston in said cylinder, a fuel intake, an exhaust port in the cylinder arranged to be uncovered by the piston during the latter part of its outward stroke, a second exhaust port arranged to be opened at the beginning of the exhaust stroke of the piston, means for introducing air above atmospheric pressure into the cylinder during the latter part of the exhaust stroke, during the suction stroke, and during the initial portion of the compression stroke, and means for introducing fuel during the compression stroke subsequently to the closure of the first mentioned exhaust port.

In testimony of which invention, I have hereunto set my hand, at Philadelphia, Pennsylvania, on this 14th day of December, 1925.

BERTHA E. SETZ,
*Administratrix of the Estate of Hans R. Setz, Deceased.*